United States Patent [19]

Krchma

[11] 3,988,085
[45] Oct. 26, 1976

[54] APPARATUS FOR FORMING UNIFORM SHAPED PARTICLES OF THERMOPLASTIC MATERIAL

[76] Inventor: Ludwig C. Krchma, P.O. Box 7101, Kansas City, Mo. 64113

[22] Filed: Nov. 24, 1975

[21] Appl. No.: 634,823

[52] U.S. Cl. ................................ 425/71; 425/316; 425/378 R; 264/141; 264/180
[51] Int. Cl.² ........................................ B29C 25/00
[58] Field of Search............ 425/71, 67, 316, 378 R, 425/385; 264/141, 144, 178 R, 180, 237

[56] References Cited
UNITED STATES PATENTS

| | | | |
|---|---|---|---|
| 2,153,031 | 4/1939 | Zetzsche et al. ................ | 425/316 X |
| 2,311,389 | 2/1943 | Hawks et al. .................... | 425/315 X |
| 2,619,677 | 12/1952 | Ryan ................................ | 264/180 |
| 3,222,719 | 12/1965 | Wagner et al. ................... | 425/378 R |

*Primary Examiner*—Richard B. Lazarus
*Attorney, Agent, or Firm*—Fishburn, Gold & Litman

[57] ABSTRACT

An apparatus and method for reducing molten thermoplastic material to substantially uniform shaped particles for storage, further handling, and use includes an elongated inclined liquid channel or flume for flow of a stream of cooling liquid and a material supply device operative to continuously direct a plurality of laterally spaced thin strips or ribbons of molten thermoplastic material into the stream of cooling liquid to be partially cooled thereby and a drum having a plurality of blade members for forming longitudinally spaced areas of reduced thickness in each of the strips or ribbons of material whereby the strips or ribbons of material break at the reduced thickness areas immediately or upon same becoming brittle by further cooling to a point that the particles are non-fusing with the strips or ribbons of thermoplastic material being supported during engagement thereof by the blade members. The uniform shaped particles are moved through flumes and selected paths for further cooling, drying, and handling for delivery of the particles to a place of storage or further use.

10 Claims, 6 Drawing Figures

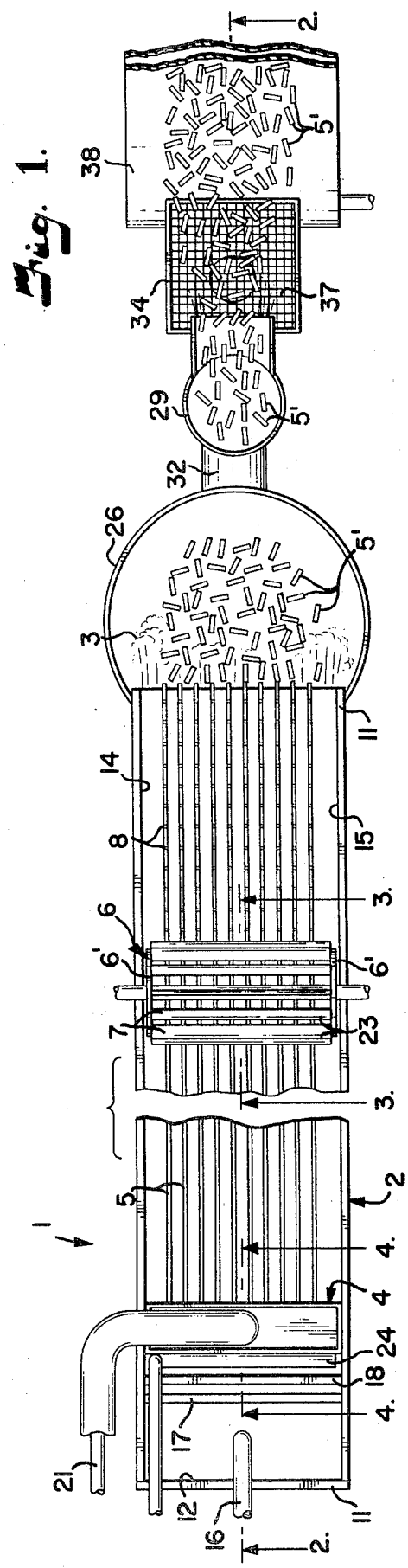
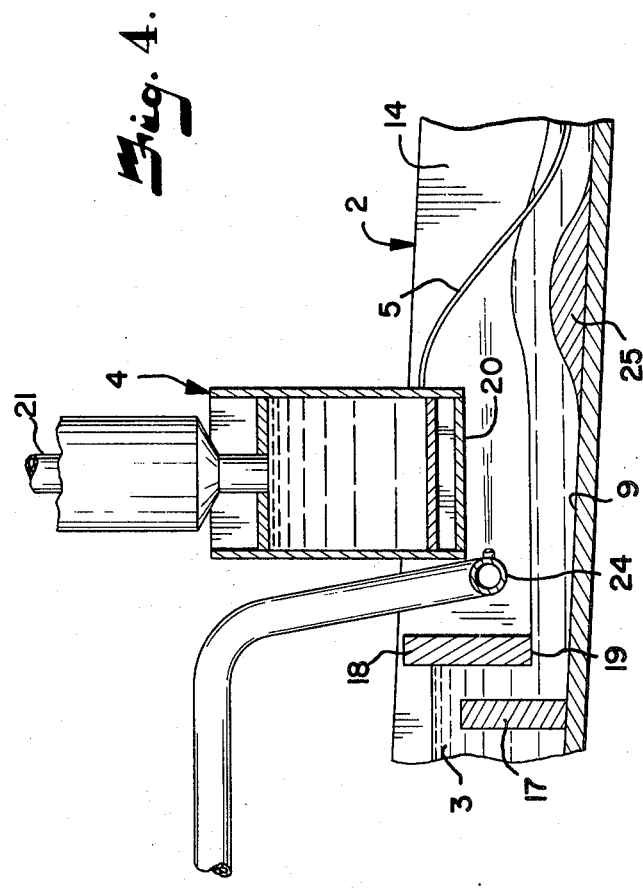

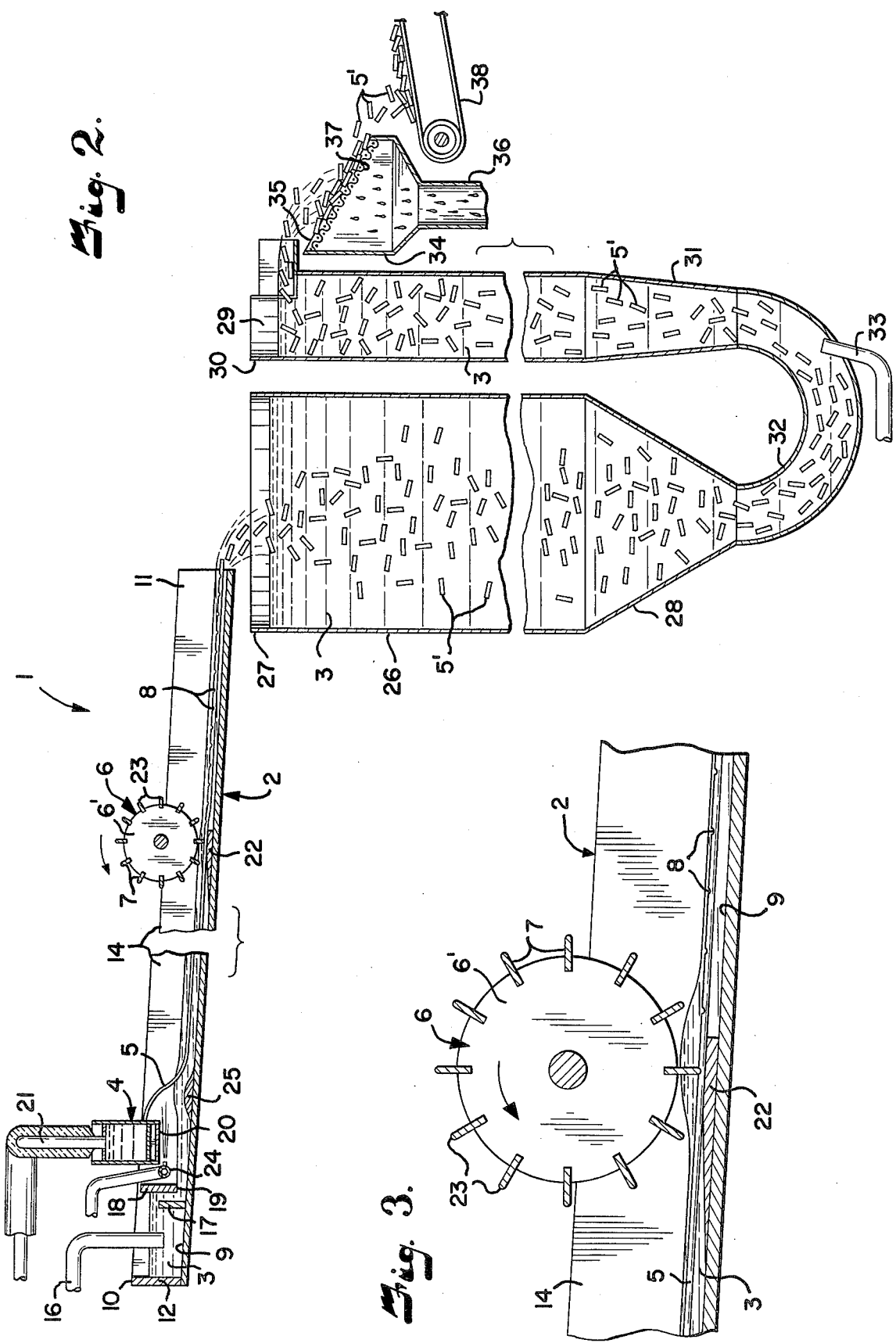

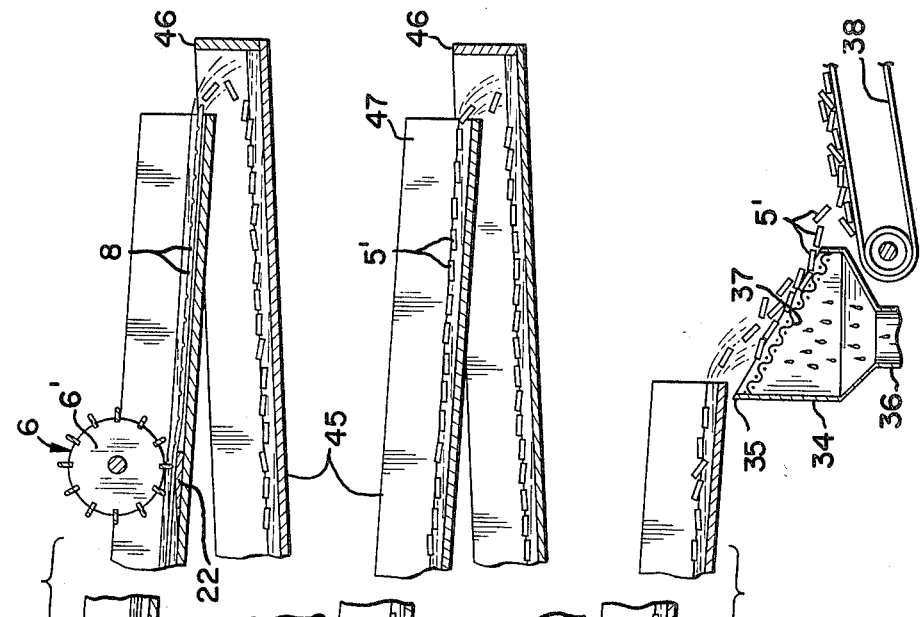
Fig. 6.
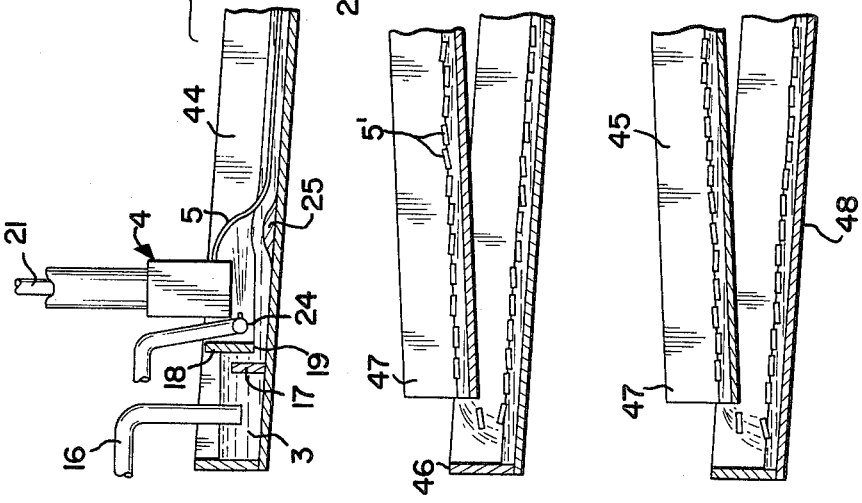
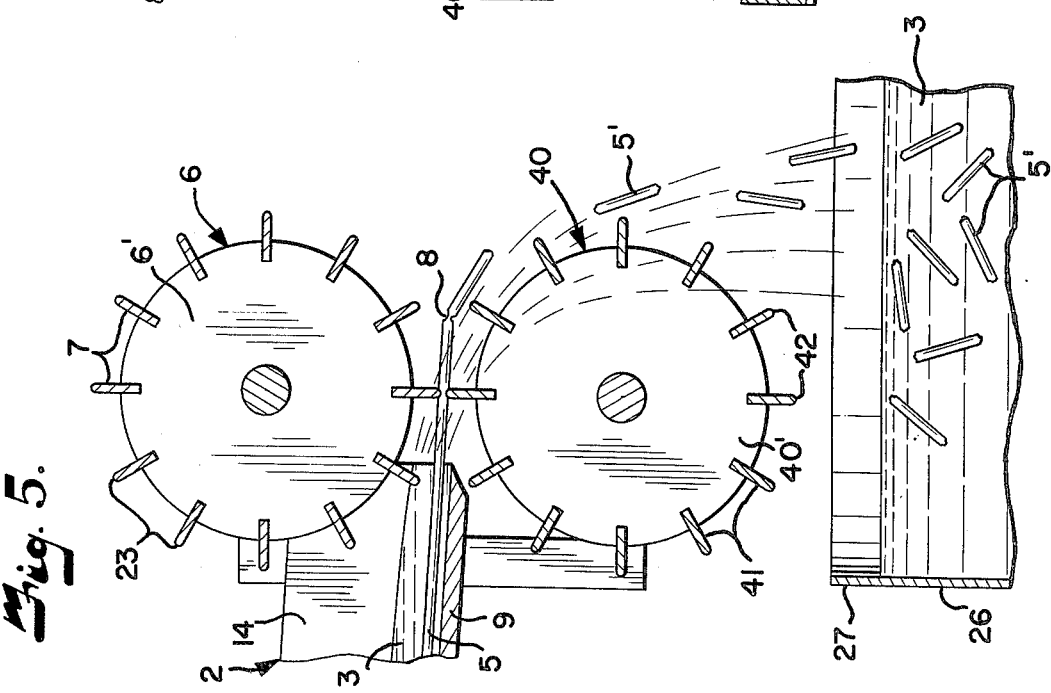
Fig. 5.

APPARATUS FOR FORMING UNIFORM SHAPED PARTICLES OF THERMOPLASTIC MATERIAL

The present invention relates to an apparatus for reducing molten thermoplastic material to substantially uniform shaped particles for storage, further handling, and use and more particularly to an apparatus for forming reduced thickness areas in thin strips or ribbons of molten thermoplastic material so that the material breaks at the reduced thickness areas upon same becoming brittle by cooling and being subjected to turbulence.

The Hawks, et al U.S. Pat. No. 2,311,389, issued Feb. 16, 1943, discloses a Method and Apparatus for Handling Asphalt. The disclosed apparatus produces particles of random length including fines and particles both longer than and shorter than desired. The Hawks et al apparatus includes a long forming and cooling flume.

It is desirable to ship bulk quantities of hard thermoplastic materials, such as pitch, asphalt, wax, sulfur and some polymers by means of tank truck transports, railroad tank cars, and the like. Thermoplastics are usually molten prior to use, however, processing usually includes handling of same in a solid cold condition to accomodate handling and storage or processing, such as grinding. It is, therefore, necessary to form, cool, and solidify thermoplastic materials and have them in a solid cold condition where they do not coalesce or bond together and are easily handled. Heretofore, several plastic materials have been solidified and cooled by being introduced as rods or ribbons of molten materials into a flowing coolant, such as water in a manner such that the rod or ribbon is intact and the coolant carries the material, rod, or ribbon along a channel or pipe. The coolant velocity and channel or pipe length are selected to provide sufficient time to cool the thermoplastic material. The prior art method includes cooling the rod or ribbon of thermoplastic material to a point of brittleness and effects breaking of same into random pieces and fines.

Another method of cooling thermoplastic materials is to apply same as a continuous layer or sheet or a plurality of closely spaced ribbons onto a moving belt, drum, or disc of a length and size and at a speed such that the thermoplastic material is cooled to a solid state and removed. This procedure produces random sizes and shapes and particularly fines and dust.

The fines and dust produced by the prior art apparatus and methods contribute to many undesirable working and handling conditions. The random sizes and shapes and the fines and dust add to produce packing under load and in storage. This increases the tendency to coalesce or bond together and increases material handling problems while unloading and transferring bulk quantities of material. When water or other liquid is used for cooling, water is retained in the fines or dust also contributing to difficulty in handling and weight increase as well as freezing and thawing in colder climates.

Cooling in the prior art methods and apparatus requires long retention and flow due to the rod or ribbon being intact. Maximum cooling is obtained only after the rod or ribbons break into pieces and thereby increase the surface area.

The present invention avoids the aforementioned problems and provides uniform sizes and shapes with substantially fewer fines and dust thereby increasing the cooling area at an early stage in the process by cutting or notching thermoplastic materials so that uniform sizes and shapes are obtained. Applicant discloses forming strips or ribbons which are cooled sufficiently to form a hard skin or surface and forming spaced areas of reduced thickness defining breaking points. Applicant's method and apparatus is adapted to form said reduced thickness areas in sheets as well as strips or ribbons of thermoplastic material.

It has been found that a chilled or cooled skin developed early in the forming and cooling process results in an outer layer or surface approximating the temperature of the coolant or cooling liquid. The core of the strips, ribbons, or layer of material is cooling slower than the surface and is therefore substantially softer. It has also been found that when the skin or surface is hardened and the core is still soft that a quickly applied blade or thin bar will notch or form the strip or ribbon of material into an area of reduced thickness. The thermoplastic material does not stick or adhere to the blade or thin bar if same is quickly applied and removed. It has also been found that applying the blade or thin bar to the material prior to forming a hard surface or skin, that the material sticks or adheres readily to the blade or bar. Also, if the core of the strip or ribbon of material has cooled, the strip or bar shatters and produces fines and dust under rapid application of a blade or bar.

The principal objects of the present invention are: to provide an apparatus and method for forming uniform shaped particles of thermoplastic material overcoming the disadvantages of the above described apparatus and other prior art apparatus; to provide an apparatus and method for forming uniform shaped particles of thermoplastic material having uniform length for convenient handling in bulk form without undue further breakage; to provide such an apparatus and method including means for cutting of forming areas of reduced thickness in thin strips or ribbons of thermoplastic material so that the material breaks at the reduced thickness areas upon same becoming brittle by cooling and being subjected to turbulence; to provide such an apparatus which forms a minimum of fines; to provide such an apparatus including flow means for moving cooling liquid and particles together and cooling the particles below a temperature at which the particles bond or fuse together; to provide such an apparatus including means for directing cooling liquid or fluid toward thin strips or ribbons of molten thermoplastic material prior to impact thereof with a stream of cooling liquid; to provide such an apparatus including means to raise and form an arcuate upper surface for the cooling liquid stream such that thin strips or ribbons of molten thermoplastic material are substantially tangent to the arcuate surface at point of impact; to provide such apparatus wherein the means for forming areas of reduced thickness in the thin strips or ribbons of thermoplastic material are operative to urge the thin strips or ribbons away from a material supply device; and to provide such an apparatus for forming uniform shaped particles of thermoplastic material which is economical to manufacture, positive in operation, durable in use, and particularly well adapted for the proposed use.

Other objects and advantages of this invention will become apparent from the following description taken in connection with the accompanying drawings wherein are set forth, by way of illustration and example, certain embodiments of this invention.

The drawings constitute a part of the specification and include exemplary embodiments of the present invention and illustrate various objects and features of the apparatus for forming uniform shaped particles of thermoplastic material.

FIG. 1 is a top plan view of the apparatus.

FIG. 2 is a longitudinal sectional view of the apparatus and taken on line 2—2 of FIG. 1.

FIG. 3 is an enlarged fragmentary longitudinal sectional view taken on line 3—3 of FIG. 1 and showing blade members for forming uniformly spaced areas of reduced thickness in strips or ribbons of thermoplastic material.

FIG. 4 is an enlarged fragmentary longitudinal sectional view taken on line 4—4 of FIG. 1 and showing a weir shaped to form an arcuate upper surface in the cooling liquid stream.

FIG. 5 is an enlarged fragmentary longitudinal sectional view similar to FIG. 3 except showing opposed blade members.

FIG. 6 is a fragmentary longitudinal sectional view showing a modified cooling flume and means for separating particles and cooling liquid.

As required, detailed embodiments of the present invention are disclosed herein, however, it is to be understood that the disclosed embodiments are merely exemplary of the invention which may be embodied in various forms. Therefore, specific structural and functional details disclosed herein are not to be interpreted as limiting but merely as a basis for the claims and as a representative basis for teaching one skilled in the art to variously employ the present invention in virtually any appropriately detailed structure.

Referring more in detail to the drawings

In the disclosed embodiment of the present invention, the reference numeral 1 designates generally an apparatus for reducing molten thermoplastic material to substantially uniform shaped particles for storage, further handling, and use. The apparatus 1 includes an enlongated inclined liquid flume or channel 2 for flow of a stream of cooling liquid 3 and a material supply device 4 operative to direct a plurality of laterally spaced continuous thin strips, rods or ribbons 5 of molten thermoplastic material into the stream of cooling liquid 3 to be cooled thereby. The apparatus 1 includes a drum 6 having a plurality of blade members 7 for forming longitudinally spaced areas 8 of reduced thickness in each of the thin strips or ribbons 5 of material whereby the strips or ribbons 5 of material are cut or break at the reduced thickness areas 8 immediately or upon becoming brittle by further cooling and being subjected to turbulence. The strips or ribbons 5 of thermoplastic material are supported during engagement thereof by the blade members 7. The uniform shaped particles 5' are moved through flumes and selected paths for further cooling, drying, and handling for delivery of the particles 5' to a place of storage or further use.

The liquid channel or flume 2 is illustrated as having a base or bottom wall 9 extending between an upper end 10 and a lower end 11 of the flume 2. An end wall 12 is mounted on the bottom wall 9 at the upper end 10 and side walls 14 and 15 cooperate with the bottom wall 9 and the end wall 12 and define a liquid receiving chamber into which the cooling liquid 3 is discharged by a suitable pipe 16.

The receiving chamber has a weir member 17 and a flash member 18 having a lower edge 19 spaced from an upper surface of the bottom wall 9 thereby serving to distribute the cooling liquid 3 into a rapidly flowing even stream passing down the flume 2 at a rather rapid rate and having a substantially undisturbed upper surface without ripples of substantial size. The flash member 18 is preferably adjustable in order that the flow of liquid 3 may be controlled by regulating the clearance between the lower edge 19 of the flash member 18 and the bottom of the flume to compensate for operating variables or adjust conditions to a particular operation.

The material supply device 4 is downstream from the flash member 18 and has a double bottom 20 which serves as a steam chest for heat control purposes. The material supply device 4 receives molten thermoplastic material under pressure from an insulated pipe 21. The temperature of the molten material may vary, however, it is preferred that it be less than 450° F. The material supply device 4 has a plurality of slits, apertures, or orifices on the downstream side and each is sized to provide the desired shape and thickness of molten thin strips, rods or ribbons 5 of thermoplastic material. The strips or ribbons 5 of thermoplastic material are deposited into the flowing stream of cooling liquid 3 and each forms a ribbon or rod in the liquid 3, which moves downwardly with the flowing liquid and is cooled thereby. As the cooling proceeds the outer portion solidifies forming a smooth outer skin while the interior is still soft.

The apparatus 1 includes means downstream of the material supply device 4 for forming the longitudinally spaced areas 8 of reduced thickness in each of the strips, rods or ribbons 5 of material whereby the strips or ribbons 5 of material are cut or break at the reduced thickness areas upon same becoming brittle by cooling and being subjected to turbulence. Means are also provided in the flume 2 below the strips 5 of thermoplastic material to support same during movement of the strips 5 of material thereover during forming of the reduced thickness areas 8. The means for forming the reduced thickness areas is spaced downstream from the material supply device 4 a distance which assures the cooling to form the skin on the ribbons with the interior soft for easy forming without adherance of any of the material to forming members.

In the illustrated structure, a generally planar support member 22 flush with the bottom or at a desired level thereabove extends between and has opposite ends thereof suitably supported on the side walls 14 and 15 of the flume 2. The support member 22 is positioned adjacent the lower end 11 of the flume 2 and immediately below the drum 6 and the blade members 7 thereon.

The blade members 7 are mounted for movement of respective edge portions 23 thereof toward and away from the support member 22. The movement of the blade members 7 is into the thermoplastic material at substantially uniform time intervals and to within a selected spacing from the support member 22 thereby effecting a selected penetration into the strips 5 of material.

In the illustrated structure, the drum 6 is rotatably mounted and has an axle defining a longitudinal axis thereof extending normal to the longitudinal axis of the liquid flume 2. The drum 6 has opposite end members 6' and the blade members 7 are circumferentially spaced around the opposite end members 6' of the drum and are substantially parallel with the longitudinal axis of the drum 6. The edge portion 23 of the blade members 7 are successively movable into the strips or ribbons 5 of material upon rotation of the drum 6.

It is desirable to effect surface cooling of the strips or ribbons 5 of material between the supply device 4 and the surface of the cooling liquid 3 and to space the material supply device 4 from the upper surface of the cooling liquid 3 to thereby reduce insulation requirements of the material supply device 4. Therefore, the apparatus 1 includes means adjacent the material supply device 4 and within the liquid flume 2 for directing a cooling fluid toward the strips, rods or ribbons 5 of molten thermoplastic material after discharge from the supply device 4 for cooling the surface of the strips or ribbons 5 of thermoplastic material prior to contact with the stream of cooling liquid.

In the illustrated structure, a mist pipe 24 is positioned between the flash member 18 and the material supply device 4 and has an end portion extending transverse of the flume 2 and normal to the longitudinal axis thereof. The mist pipe 24 receives a mixture of air and mist under pressure and has a plurality of longitudinally spaced orifices or apertures positioned to direct cooling fluid toward the strips or ribbons 5 of thermoplastic material leaving the supply device 4 while still molten. The mixture of air and moisture or mist effects lifting or elevating of the strips or ribbons 5 of material and cooling of same.

It is desirable to reduce spacing between the orifices or apertures of the supply device 4 and the upper surface of the cooling liquid stream 3. Therefore, the apparatus 1 includes means in the flume 2 and downstream of the material supply device 4 to raise and form an upper surface of the cooling liquid stream 3 in an arcuate shape whereby the strips or ribbons 5 of molten thermoplastic material are substantially tangent to the upper surface of the cooling liquid stream 3 at an impact point of the strips or ribbons 5 of molten material into the stream of cooling liquid 3.

In the illustrated structure, a weir member 25 is mounted on the bottom wall 9 and extends between the side walls 14 and 15. The weir member extends transversely of and normal to the longitudinal axis of the flume 2. The weir member 25 has a generally arcuate upper surface whereby the upper surface of the stream 3 conforms thereto. The spacing of the weir member 25 downstream of the supply device 4 and the discharge from the mist pipe 24 cooperate in positioning the impact point of the strips or ribbons 5 of molten material into the stream of cooling liquid 3 such that the strips or ribbons are substantially tangent to the cooling liquid. The impact point of each of the strips 5 of material is on the downstream side of the arcuate shaped upper surface of the cooling liquid stream.

The apparatus 1 includes means adjacent and downstream from the drum 6 and the support member 22 for receiving the cooling liquid 3 and the particles 5' of the thermoplastic material and moving same together to effect cooling of the particles 5' below a temperature at which the particles fuse, bond, or melt together. The means for receiving the cooling liquid and particles 5' is operative to effect turbulence in the liquid thereby breaking the strips or ribbons 5 at the reduced thickness areas.

In the illustrated structure, a first tower 26 has an upper end 27 thereof positioned adjacent the lower end 11 of the flume 2. The first tower 26 is adapted for downwardly flow of particlss 5' and cooling liquid therein and through a lower end portion 28 of reduced size. A second tower 29 is positioned adjacent the first tower 26 and has an upper end 30 and a lower end portion 31. The second tower 29 is adapted for upwardly flow of particles 5' and cooling liquid therein. A connection or flow member 32 extends between and has opposite ends thereof connected to the lower end portions 28 and 31 of the first and second towers 26 and 29 respectively for flow of particles 5' and cooling liquid 3 therebetween.

The towers 26 and 29 are illustrated as being generally cylindrical in shape and the flow member 32 defines a generally U-shaped path between the towers for flow of particles 5' and liquid from the first tower 26 to the second tower 29. The lower end portion 28 of the first tower 26 is an inverted cone formed by a downwardly converging side wall whereby the velocity of flow increases into the connection or flow member 32. The lower end portion 31 of the second tower 29 is also an inverted cone formed by a downwardly converging side wall whereby the velocity of flow from the connection member 32 decreases upon entering the second tower 29.

The apparatus 1 includes means communicating with the connection member 32 to supply a high velocity stream of liquid or air into the connection member 32 and directed toward the lower end portion 31 of the second tower 29 to assist in upward flow of cooling liquid and particles 5' through the second tower 29. In the illustrated structure, a pipe 33 communicates with the connection or flow member 32 and has a flow line directed toward the entrance to the lower end portion 31 of the second tower 29. The pipe 33 receives cooled air or liquid under pressure and is adapted to increase the velocity of the upper flow in the second tower 29 and in member 32.

The apparatus 1 includes means adjacent the second tower 29 for separating the cooling liquid 3 from the particles 5'. In the illustrated structure, a receptacle 34 has an upper portion 35 positioned adjacent the upper end 30 of the second tower 29 and positioned to receive the cooling liquid 3 and the particles therefrom. A discharge pipe or flow member 36 communicates with the receptacle 34 and is adapted to receive the cooling liquid therefrom. The cooling liquid received from the receptacle 34 may be cooled and recirculated for delivery to the pipe 16.

A screen 37 is mounted on the upper end 35 of the receptacle 34 and has openings smaller than the smallest dimension of the particles of thermoplastic material. The screen 37 is inclined downwardly from the upper end 30 of the second tower 29. The particles may fall from the screen 37 into a stockpile or be directed onto a suitable conveyor 38 for delivery to a point of storage, further use, or handling.

In using an apparatus as illustrated and described, flow of cooling liquid 3 is established in the flume 2. The molten strips, rods or ribbons 5 are then extruded from the material supply device 4 and extend into the stream of cooling liquid 3. The mist pipe 24 may be used to apply a suitable parting agent to the strips or ribbons 5 of thermoplastic material, such as soaps or the like. The drum 6 is rotated to form the areas 8 of reduced thickness such that the continuous strips or ribbons 5 are immediately cut or break and the particles move to the first tower 26. The blade members 7 are preferably coated with a suitable release or parting agent to eliminate bonding of the thermoplastic thereto during forming of the reduced thickness areas 8. The jet of air or liquid from the pipe 33 aids upward flow in the second tower 29 and through member 32. The particles cool sufficiently in the first and second towers 26 and 29 whereby flow from the upper end 30 of the second tower 29 is onto the screen 37 which separates the liquid 3 and particles which are received on the conveyor 38.

FIG. 5 illustrates modified means for forming reduced thickness areas 8 in the strips or ribbons 5 of thermoplastic material. The support member 22 is replaced by a lower or second drum 40 having an axle defining a longitudinal axis of the second drum 40 extending normal to the longitudinal axis of the flume or channel 2 and below and parallel with the longitudinal axis of the first or upper drum 6. The second or lower drum 40 has a peripheral surface spaced from the peripheral surface of the upper or first drum 6.

A plurality of circumferentially spaced elongated blade members 41 are mounted on opposite end members 40' of the second drum 40 and extend substantially parallel with the longitudinal axis thereof. The blade members 41 on the second drum 40 each have an edge portion 42 and are mounted to have the edge portion 42 thereof positioned in facing relation with the edge portion 23 of a respective one of the blade members 7 mounted on the opposite end members 40' of the first drum 6 upon rotation of the first and second drums 6 and 40 in opposite directions.

FIG. 6 illustrates a modified means for effecting cooling of the particles 5' below a temperature at which same fuse, bond, or melt together. A modified upper flume 44 has a length greater than the length of the flume or channel 2 as illustrated in FIGS. 1 to 5 inclusive. A plurality of intermediate flumes 45 each have an upper end 46 thereof positioned to receive particles 5' and liquid from a lower end 47 of an adjacent flume. A lower end of a lower flume 48 is positioned adjacent the receptacle 34 which is constructed as shown in FIGS. 1 and 2.

Use of an apparatus having the flumes constructed as illustrated in FIG. 6 is substantially similar to use of the structure illustrated in FIGS. 1 to 5 except that cooling in the flumes 44, 45, and 48 is sufficient to avoid fusing, bonding, or melting together of particles 5' when discharged onto the conveyor 38.

It is to be understood that while I have illustrated and described certain forms of my invention, it is not to be limited to these specific forms or arrangement of parts herein described and shown.

What I claim and desire to secure by Letters Patent is:

1. Apparatus for reducing molten thermoplastic material to substantially uniform shaped particles and comprising:
   a. means defining an elongated inclined liquid channel having an upper end and a lower end and a longitudinal axis therebetween;
   b. means adjacent the upper end of said liquid channel to supply a stream of cooling liquid to the upper end of said channel;
   c. means downstream of said cooling liquid supply means to direct one or more strips of molten thermoplastic material into the stream of flowing cooling liquid to be cooled thereby; and
   d. means downstream of said means to direct molten material into the stream of cooling liquid for forming longitudinally spaced areas of reduced thickness in each of the strips of material whereby the strips of material separate at the reduced thickness areas upon becoming brittle by cooling.

2. Apparatus for reducing molten thermoplastic material to substantially uniform shaped particles as set forth in claim 1 wherein said means for forming areas of reduced thickness in each of the streams of material comprises:
   a. means in said liquid channel and below the strips of thermoplastic material to support same during movement of the strips of material thereover; and
   b. blade means having an edge portion and mounted for movement of said edge portion toward and away from said means for supporting the strips of material, the movement of said blade means being into the material at substantially uniform time intervals and to within a selected spacing from said means to support the strips of material.

3. Apparatus for reducing molten thermoplastic material to substantially uniform shaped particles as set forth in claim 2 wherein said blade means includes:
   a. a rotatably mounted drum having a longitudinal axis thereof extending normal to the longitudinal axis of said channel, said drum having blade support means spaced from said means for supporting the thermoplastic material; and
   b. a plurality of circumferentially spaced elongated blade members mounted on said blade support means of said drum and extending substantially parallel with the longitudinal axis thereof, said blade members each having an edge portion movable into the material upon rotation of said drum.

4. Apparatus for reducing molten thermoplastic material to substantially uniform shaped particles as set forth in claim 3 wherein said means to support the strips of thermoplastic material comprises:
   a. a second rotatably mounted drum having a longitudinal axis thereof extending normal to the longitudinal axis of said channel and below and parallel with the longitudinal axis of said first named drum, said second drum having blade support means spaced from the blade support means of said first named drum; and
   b. a plurality of circumferentially spaced elongated blade members mounted on said blade support means of said second drum and extending substantially parallel with the longitudinal axis thereof, said blade members on said second drum each having an edge portion and being mounted to have the edge portion thereof positioned in facing relation with the edge portion of a respective one of said blade members mounted on said blade support means of said first named drum upon rotation of said first named and second drum.

5. Apparatus for reducing molten thermoplastic material to substantially uniform shaped particles as set forth in claim 1 including:
   a. said strips being a plurality of laterally spaced continuous strips;
   b. means adjacent and downstream from said means for forming areas of reduced thickness in each of the streams of material for receiving the cooling liquid and the particles of thermoplastic material and moving same together to effect cooling of the particles below a temperature at which the particles bond together; and c. means adjacent said means to effect cooling of the particles for separating the cooling liquid from the particles.

6. Apparatus for reducing molten thermoplastic material to substantially uniform shaped particles as set forth in claim 5 wherein:
   a. said means for receiving the cooling liquid and the particles of thermoplastic material and moving same together comprises:
      1. a first tower having an upper end adjacent the lower end of said channel for downward flow of particles and cooling liquid therein, said first tower having a lower end of reduced size;
      2. a second tower having an upper and a lower end for upward flow of particles and cooling liquid therein; and
      3. a connection member extending between and having opposite ends thereof connected to the lower ends of said first and second towers for flow of particles and cooling liquid therebetween; and
   b. said means for separating the cooling liquid from the particles comprises:
      1. a receptacle having an upper portion and positioned adjacent the upper end of said second tower and positioned to receive the cooling liquid and the particles therefrom;
      2. a flow member communicating with said receptacle for receiving cooling liquid therefrom; and
      3. screen means mounted on the upper portion of said receptacle and having openings smaller than the smallest dimension of the particles, said screen means being inclined downwardly from the upper end of said second tower.

7. Apparatus for reducing molten thermoplastic material to substantially uniform shaped particles as set forth in claim 6 including means communicating with said connection member to supply a high velocity stream of liquid into said connection member and directed toward the lower end of said second tower to assist in upward flow of cooling liquid and particles in said second tower.

8. Apparatus for reducing molten thermoplastic material to substantially uniform shaped particles as set forth in claim 1 including means in said channel and adjacent said means to direct strips of molten material into the stream of cooling liquid for directing cooling fluid toward said means to direct strips of molten material into the stream of cooling liquid and toward the strips of molten material for cooling same prior to contact with the stream of cooling liquid.

9. Apparatus for reducing molten thermoplastic material to substantially uniform shaped particles as set forth in claim 1 including means in said channel and downstream of said means to direct strips of molten material into the stream of cooling liquid to raise and form an upper surface of the cooling liquid stream in an arcuate shape whereby the strips of molten material are substantially tangent to the upper surface of the cooling liquid stream at an impact point of the strips of molten material into the stream of cooling liquid.

10. Apparatus for reducing molten thermoplastic material to substantially uniform shaped particles as set forth in claim 1 including:
   a. means in said channel and adjacent said means to direct strips of molten material into the stream of cooling liquid for directing fluid toward said means to direct strips of molten material into the stream of cooling liquid and toward the strips of molten material for cooling same prior to contact with the stream of cooling liquid; and
   b. means in said channel and downstream of said means to direct strips of molten material into the stream of cooling liquid to raise and form the upper surface of the cooling liquid stream in an arcuate shape whereby the strips of molten material are substantially tangent to the upper surface of the cooling liquid stream at an impact point of the strips of molten material into the stream of cooling liquid.

* * * * *